United States Patent
Kurz

(10) Patent No.: US 11,365,833 B2
(45) Date of Patent: Jun. 21, 2022

(54) PRESS SEAL SYSTEM FOR SEALING AGAINST A LINE

(71) Applicant: Hauff-Technik GmbH & Co. KG, Hermaringen (DE)

(72) Inventor: Ralf Kurz, Giengen (DE)

(73) Assignee: Hauff-Technik GmbH & Co. KG, Hermaringen (DE)

( * ) Notice: Subject to any disclaimer, the term of this patent is extended or adjusted under 35 U.S.C. 154(b) by 658 days.

(21) Appl. No.: 15/907,559

(22) Filed: Feb. 28, 2018

(65) Prior Publication Data

US 2018/0252338 A1 Sep. 6, 2018

(30) Foreign Application Priority Data

Mar. 2, 2017 (EP) .................................. 17020085

(51) Int. Cl.
*F16L 5/10* (2006.01)
*F16L 5/08* (2006.01)

(52) U.S. Cl.
CPC .. *F16L 5/10* (2013.01); *F16L 5/08* (2013.01)

(58) Field of Classification Search
CPC ... F16J 15/52; F16J 15/525; F16L 5/02; F16L 5/08; F16L 5/10; F16L 41/088
USPC ................................ 285/194, 204, 205, 208
See application file for complete search history.

(56) References Cited

U.S. PATENT DOCUMENTS

| 1,134,565 | A | * | 4/1915 | Vibber | ................. | H02G 3/0683 |
| | | | | | | 285/154.3 |
| 5,366,318 | A | * | 11/1994 | Brancher | ................. | E03F 3/04 |
| | | | | | | 285/136.1 |
| 5,988,698 | A | * | 11/1999 | Bravo | ..................... | F16L 5/08 |
| | | | | | | 285/139.2 |
| 6,409,179 | B1 | | 6/2002 | Daoud | | |
| 2007/0075504 | A1 | * | 4/2007 | Kurz | ........................ | F16L 5/02 |
| | | | | | | 277/606 |

FOREIGN PATENT DOCUMENTS

| EP | 0994287 B2 | 4/2000 |
| FR | 2935329 A1 | 3/2010 |

OTHER PUBLICATIONS

EPO Search Report dated Jun. 28, 2017.

* cited by examiner

*Primary Examiner* — Christine M Mills
*Assistant Examiner* — L. Susmitha Koneru
(74) *Attorney, Agent, or Firm* — Wood, Phillips, Katz, Clark & Mortimer

(57) ABSTRACT

The invention relates to a press seal system (1,2) for inserting into an opening (3) and sealing said opening (3) against a line (20), wherein the press seal system comprises an elastomer body (1) for being tensioned in said opening (3) and a seal member (2) which is decoupled from the deformation of said elastomer body (1), namely said seal member (2) being deformable radially more easily than said elastomer body (1), at least when said elastomer body (1) is tensioned, so that said seal member (2) can be sealed against said line (20) even when said elastomer body (1) has already been tensioned.

11 Claims, 2 Drawing Sheets

PRESS SEAL SYSTEM FOR SEALING AGAINST A LINE

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to a press seal system for inserting into an opening and sealing the opening against a line.

BACKGROUND OF THE INVENTION

Press seals are for instance used for sealing a through-opening in a wall against a line led through. The through-opening in the wall, for instance a core drilling, has an inner diameter larger than an outer diameter of the line led through, so that an annular space between the line and a soffit defining the through-opening remains free. Into this annular space, the press seal is inserted, and it is tensioned for sealing. For this purpose, the press seal comprises an elastomer body basically filling out the annular space and a tensioning device by which the elastomer body can be tensioned, namely compressed axially. Due to the axial compression, the elastomer body widens radially, namely is brought into a sealing contact, outwards against the soffit and inwards against an outer lateral surface of the line. Thus, at the same time, a sealing against the soffit and the line is achieved.

The present invention is to solve the technical problem to provide an advantageous press seal system having an elastomer body and a tensioning device.

SUMMARY OF THE INVENTION

According to the invention, this problem is solved by the features of claim 1. In addition to the elastomer body and the tensioning device, the press seal system comprises a seal member which is decoupled from the tensioning and deformation of the elastomer body. The press seal system is installed in the opening by tensioning the elastomer body, an outer circumferential surface of the elastomer body being pressed outwards sealingly against a soffit defining the opening. Therein, however, the inner circumferential surface which lies radially opposite to the outer circumferential surface is not used for sealing against the line, but the seal member is provided for that purpose. The seal member can for example be provided as an elastomer sleeve extending axially away from the elastomer body and can for instance be pressed by a hose clamp against the line, see below and the figures for illustration.

In general, the decoupling of the sealing against the soffit and the line can be advantageous, because the tensioning of the elastomer body (for sealing against the soffit) can require more expertise or even a specific tooling. For instance, the tensioning of tensioning bolts provided for moving the press bodies arranged at the opposite front faces of the elastomer body towards each other can require observing specific torque limits. In case that a torque and the tensioning force is too small, the seal effect could be negatively impacted, whereas a torque exceeding a limit can cause a damage of the elastomer body. Thus, during the mounting of the press seal, it can be necessary to consider certain boundary conditions and a special tooling can be required, for instance a torque handle.

If for instance later on an electrician lays a cable through the opening, this electrician is possibly not aware of the special mounting requirements of the respective press seal and might further not have the appropriate special tooling. In case of the present press seal system, it can be much easier for an electrician to lay the cable through the seal member decoupled from the elastomer body and to attach it by for instance a hose clamp, see the exemplary embodiments of FIGS. 1-3 for illustration. Also in case of the exemplary embodiment according to FIG. 4, a subsequent laying of the cable is significantly easier, it has only to be pushed through the funnel-shaped seal member.

In comparison to a press seal, where the inner circumferential surface of the elastomer body is used for sealing against the line, the present decoupling can for instance be also advantageous insofar as the line can be laid obliquely towards or through the opening. For instance, a sleeve-like seal member can be tilted to some degree with respect to the center axis of the elastomer body through-opening, so that for example a line extending obliquely to the opening, for instance due to a limited space or restrictions in the radii of curvature, can be sealed. In contrast thereto, the inner circumferential surface of the elastomer body would define a certain direction for the line, typically parallel to the center axis. Finally, the decoupled seal member can be also advantageous in view of a certain flexibility regarding different line diameters, for instance a sleeve-like seal member can be pressed against lines having different outer diameters.

Due to the decoupling of the elastomer body and the seal member, the latter is "deformable radially more easily" than the tensioned elastomer body. This means for instance that, when applying the same radial pressure, an inner wall surface of the seal member is deformed more than the inner circumferential surface of the tensioned elastomer body, for instance by at least a 1,5-, 2,5- or 5-fold (with possible upper limits by for instance not more than a 100-, 50-, or 25-fold). The pressure results from a force acting radially outwards and causes a widening of the inner wall surface of the seal member, which is compared with the widening of the inner circumferential surface (therein, a possible restriction to the widening of the seal member caused by a tensioning member provided on the outside of the seal member is neglected).

Due to the decoupling of the elastomer body and the seal member, an outer wall surface of the seal member, which faces away from the center axis of the elastomer body through-opening, is accessible even when the elastomer body is in the tensioned state, so that a tensioning member operable independently of the elastomer body can be arranged there, see in detail below. In other words, the outer wall surface of the seal member is, even when the elastomer body is in the tensioned state, basically uncovered radially outwards, possibly apart from a tensioning member operable independently of the elastomer body. This definition of "decoupled" shall also be disclosed as an alternative definition of the decoupling of the seal member and the elastomer body referred to in claim 1.

In general, in this disclosure, "radial" relates to directions perpendicular to the center axis of the elastomer body through-opening ("radial directions"). Therein, without an explicit contrary remark, descriptions as "inside" and "outside" or "inner" and "outer" relate also to the radial directions, a location "inside" being for instance closer to the center axis and a location "outside" being more distant therefrom. In general, the term "radial" or a "diameter" shall not necessarily imply a circular shape; for instance, the diameter shall be a mean value of the smallest and the largest extension in a plane perpendicular to the center axis, which mean value corresponds to the circular diameter in case of the preferred circular shape (a "radius" is the half diameter, preferably the half circular diameter). "Axial" relates to directions parallel to the center axis of the elastomer body through-opening.

For the elastomer body or at least parts thereof, the center axis of the elastomer body through-opening is preferably a symmetry axis. This symmetry preferably is an n-fold rotational symmetry, particularly preferred a rotational symmetry. For in-stance, the inner lateral surface and/or the outer lateral surface of the elastomer body can fulfill the symmetry criterion, preferably it relates to the elastomer body as a whole, at least apart from through-holes in the elastomer body for the tensioning bolts. In general, a tensioning bolt is preferably provided as a part of the tensioning device, the tensioning bolt intersecting the elastomer body axially. By tensioning the tensioning bolt, the elastomer body is compressed axially, wherein the "tensioning of the tensioning bolt" can be achieved by rotating the tensioning bolt itself or a nut arranged on the tensioning bolt. When the elastomer body is tensioned (in the tensioned state), the tensioning bolt(s) can be tensioned with a torque of for instance at least 3 Nm, 4 Nm, 5 Nm, 8 Nm or 10 Nm; possible upper limits can for instance be not more than 100 Nm, 80 Nm or 60 Nm (and shall be disclosed independently of the lower limits).

Further, the tensioning device preferably comprises a respective press body at each of the two front faces of the elastomer body, which lie axially opposite with respect to each other, the press bodies being connected by the tensioning bolt in such a way that they are moved towards each other axially (for compressing the elastomer body axially) when the tensioning bolt is being tensioned. However, in general, instead of a press body provided at the front face, for instance an internal thread could be moulded into the elastomer body, for instance in case of a nut casted into the elastomer body. However, press bodies at the front faces are preferred, which can for instance be provided plate-type respectively, for example as metal plates, or can also have a more complex structure with reinforcement ribs, which can be preferred particularly in case of injection-moulded press bodies made of a rigid plastic.

The opening is preferably a through-opening in a wall or floor element. It can be defined radially by the wall or floor element itself or, at least in a section, by a frame attached to the wall or floor element, or a casing pipe inserted into the wall or floor element, or a jacket pipe casted into the wall or floor element. All of these parts can form the soffit against which the elastomer body is pressed radially, either by themselves or also in combination with each other. In general, a wall element can for instance be a bulkhead or ship wall, preferably it is the wall of a building, in particular an outer wall of the building. In general, the wall element can be brick-built, wherein a casted wall or floor element is preferred, particularly preferred made of concrete.

Further preferred embodiments are subject of the dependent claims and the description below which relates to apparatus and method or use aspects at the same time; at least implicitly, the disclosure relates to all claim categories. As far as for instance a certain suitability of the press seal system is described (for instance "being pressable outwards for sealing"), this shall also be considered as a disclosure of a corresponding use of the device (which is for instance "pressed out-wards for sealing"). Vice versa, the description of a specific use shall also be a disclosure of a suitability for using in a respective manner.

A press seal system is preferred, in which an inner wall surface of the seal member, which faces the center axis of the elastomer body through-opening, is displaced radially inwards in comparison to an inner circumferential surface of the elastomer body, at least in an axial section of the seal member, provided for being pressed against the line, at least when the elastomer body is not tensioned, preferably also in case of the elastomer body being tensioned. Therein, the inner wall surface of the seal member is considered in a state of being not yet pressed against the line. In the axial section, the seal member can for instance have an inner diameter which amounts to not more than 90%, 80%, 70%, 60% or 50% (in this order increasingly preferred) of an inner diameter of the elastomer body taken at the inner circumferential surface, wherein possible lower limits can for instance be at least 5%, 10% or 15% (and shall be disclosed independently of the upper limits). A corresponding offset or difference in diameter between the inner wall surface of the seal element and the elastomer body can for instance be advantageous, because, on the one hand, the seal element can be pressed against the line in a sealing manner then and, on the other hand, a sufficient space for the line is available inside the elastomer body so that the line can be also led through tilted with respect to the center axis.

An arrangement is preferred, in which also the outer wall surface facing away from the elastomer body through-opening is displaced radially inwards with respect to the inner circumferential surface of the elastomer body, at least in the axial section, at least when the elastomer body is not tensioned and when the seal member is not pressed against the line, namely in the initial state. In the axial section, the seal member can for instance have an outer diameter of not more than 95%, 85%, 75%, 65% or 55% of the inner diameter of the elastomer body taken at the inner circumferential surface, wherein possible lower limits can for instance be at least 10%, 15% or 20% (and shall be also disclosed independently of the upper limits). In case of a varying diameter, a mean value taken over the axial section is considered in case of the seal member, and a mean value taken over the inner circumferential surface is considered in case of the elastomer body (this shall also apply for the diameter comparison of the previous para).

In general, in the present disclosure, the "axial section" is that axial section of the seal member which is provided for being pressed or which is pressed against the line. The geometric details mentioned for the seal member shall apply at least within the axial section, and they can also be fulfilled beyond the axial section, for instance in case of a sleeve with a basically cylindrical shape, see FIGS. 1-3 for illustration. In the axial section, the wall of the seal member can for instance have a radial thickness of at least 1 mm, 2 mm or 3 mm, wherein possible upper limits can for instance be not more than 10 mm or 5 mm (wherein lower and upper limits shall also be disclosed independently of each other, the values being respectively increasingly preferred in the order mentioned). In the axial section, the seal member can for instance have a Shore hardness (Shore A) of not more than 80 Shore, 75 Shore or 70 Shore and for example at least 20

Shore, 25 Shore, 30 Shore, 35 Shore or 40 Shore (wherein upper and lower limits shall also be disclosed independently of each other).

In a preferred embodiment, at least the axial section of the seal member is displaced axially with respect to the elastomer body, having no axial overlap with the latter. Preferably, the whole seal member and the elastomer body have no axial overlap (see for instance FIG. 2 for illustration), they can be even spaced apart from each other in the axial direction (see FIG. 3 for illustration). Thus, at least the axial section of the seal member is provided axially outside of the elastomer body through-opening, which preferably applies for the whole seal member (in general, however, the seal member could be also folded inwards, into the elastomer body through-opening). In general, this embodiment can be advantageous as the outer wall surface of the seal member is accessible well then, which can simplify actuating a tensioning member provided there.

Even though an axial displacement between the axial section and the elastomer body is preferred, the axial distance in between shall not be too large on the other hand. In general, upper limits of for instance not more than 300 mm, 250 mm, 200 mm, 150 mm or 100 mm can be advantageous (in the order mentioned increasingly preferred). In case of an axial displacement, possible lower limits can for instance be at least 20 mm, 30 mm, 40 mm or 50 mm, wherein the distance can also be zero when there is no axial displacement (the upper limits mentioned shall be disclosed independently of whether an axial displacement is provided or not). The distance is taken as the smallest axial distance between the elastomer body and the axial section. In general, in this context and also regarding the displacement discussed in the previous para, the axial extension of the elastomer body is taken considering the axial extension of its outer circumferential surface pressable or pressed against the soffit (with this definition, the extension of the elastomer body can be derived, also in case of a seal member monolithic with the elastomer body, see FIG. 1 for illustration).

In a preferred embodiment, the seal member has a declining inner diameter, at least in a section, "At least in a section" relates preferably to an axial section of the seal member, which is different from the axial section provided for being pressed against the line, the inner diameter being preferably constant in the latter. When the axial section provided for being pressed against the line is displaced axially to the elastomer body (see the para above), the inner diameter of the seal member preferably decreases in the direction axially away from the elastomer body, at least up to the axial section provided for being pressed against the line.

In a preferred embodiment, a support tube is provided in the elastomer body through-opening, wherein the tensioned elastomer body, namely the elastomer body in the tensioned state, is pressed radially inwards (towards the center axis) against the support tube. In general, in this disclosure, pressing a part "against" another part means pressing in direction to this part; in general, this does not necessarily imply a contact so that a further element can be arranged in between, even though the parts pressed against each other preferably contact each other directly. In case of the support tube, in general, for instance a sleeve could be provided between the elastomer body and the support tube (see the mounting concept "sleeve between support tube and elastomer body" described below), however, preferably the support tube and the elastomer body are in a direct contact with each other, the elastomer body contacting with its inner circumferential surface an outer wall area of the support tube. Independently thereof, the support tube is a hollow tube so that its inner wall area which lies radially opposite to its outer wall area defines a through-opening ("support tube through-opening"), into or through which a line can be or is led through.

For instance, a support tube can be provided, which is arranged as a whole in-side the elastomer body, namely does not project therefrom axially. However, on the other hand, the support tube can also project from the elastomer body towards a side, preferably towards exactly one side. Namely, in particular a so-called protective tube can be provided as the support tube, which can be placed in a trench in the ground and be covered with soil (which shall be also disclosed in view of a respective method of using). In general, the line is guided in a protective tube and protected thus. The decoupling of the elastomer body and the seal member can for instance be advantageous as the protective tube can be pushed into the elastomer body first and be fixed by tensioning the elastomer body (it is mounted at the press seal system and serves as a support tube); when later on the line is led through the protective tube and the press seal system, the seal member can be used for sealing against the line, without interfering the mounting of the protective tube.

In general, as mentioned already, the line can preferably be a cable, for instance for signal or data transmission, wherein an electric cable is preferred. Therein, the advantages mentioned above ("simplified installation for an electrician in terms of mechanical requirements" and "bent line extending obliquely to the opening") can have a particular relevance. However, the line can also be a hollow tube (protective tube) in which the actual line is led then, in particular a cable. In general, the "line" can be a tube for guiding a medium, for instance gas, water or district heat, but also a cable (signal/data or electric).

As mentioned, in a preferred embodiment, a tensioning member is provided on the outside of the seal member for pressing the seal member against the line (reference is made to the remarks above regarding "pressing against"). The tensioning member can for instance be a strap, the inner diameter thereof being for example reducible by a quick lock (in particular a snap lock). Preferably, a hose clamp is provided, the inner diameter thereof being reducible by rotating a screw. In general, in comparison to the installation of the press seal itself (tensioning of the tensioning bolts and so on), the mounting effort for leading through the line can be reduced and simplified.

The tensioning member is provided at an outer wall surface of the seal member (in the axial section), which faces away from the center axis of the elastomer body through-opening. Preferably, the tensioning member contacts the outer wall surface of the seal member directly. At least where the tensioning member is provided, the seal member (which is not yet pressed on, namely in the initial state) preferably has a constant outer diameter. Independently thereof, it can be preferred that the tensioning member is held at the outer wall surface of the seal member axially, namely is held in its axial position by the seal member; for instance, the tensioning member can be held in a circumferential recess or between projections protruding radially.

In a preferred embodiment, the elastomer body and the seal member are multi-piece with each other. Nevertheless, they are sealed against each other in the press seal system. In a simple design, the seal member could for instance be provided in a sleeve-like shape over its axial extension, wherein a mounting section of this sleeve could be arranged radially between the support tube and the elastomer body for a mounting with respect to the elastomer body. The sleeve extends axially out of the elastomer body, the axial section (provided for being pressed against the line) being arranged in a section of the sleeve distal to the elastomer body.

In general, the seal member can even be provided in a manner contacting, with its mounting section, the outer circumferential surface of the elastomer body namely being clamped between the soffit defining the opening and the elastomer body when the latter is tensioned. Towards the axial section provided for being pressed against the line, the sealing element can taper with a funnel-shape; in this embodiment, the seal member covers the elastomer body and the tensioning device towards one side, which can provide a certain protection. However, it can also be advantageous when the tensioning device is uncovered (lying free) to-wards that side from which the tensioning bolts are tensioned, which allows for instance a review of the tensioning torque (torque value) without interfering the sealing towards the line.

In a preferred embodiment, the seal member is attached to the elastomer body in such a way that it can be demounted from the elastomer body even when the latter is in the tensioned state. Being "attached to the elastomer body" means having a defined position with respect to it (at least a region of the seal member has a defined position with respect to the elastomer body), being fixed there at least indirectly (the seal member attached to the elastomer body does not necessarily contact the elastomer body). This embodiment can be advantageous as for instance a replacement of the seal member by another seal member is possible without interfering the sealing of the elastomer body against the soffit. For instance, the seal member can be replaced after a certain service life, for instance to meet specific requirements in view of a material degradation. A replacement can also be of interest when the number of lines led through changes, namely an additional line is led through later on. In general, the seal member can also have a plurality of through-openings for a corresponding plurality of lines, see in detail below.

In a preferred embodiment, the seal member demountable from the tensioned elastomer body is releasably attached at a press body provided at a front face of the elastomer body (reference is made to the description above relating to the "tensioning device" and the "press body"). A seal member screwed down to the press body is preferred. For instance, a mounting section of the seal member can be clamped between the press body and a mounting body pressed axially against the press body by a screw or several screws. The mounting body can for instance be provided as a mounting plate made of metal, even though the mounting body can also comprise reinforcement ribs (reference is made to the remarks above relating to the "press body"), the latter mounting body being preferably made of synthetic material, particularly preferred as an injection moulding part (also a plate can be made of synthetic material).

In a preferred embodiment, the seal member comprises a section extending under an angle to the center axis, preferably basically perpendicularly thereto, the section being pressed against a front face of the elastomer body for mounting the seal member (see the remarks above on "pressing against"). The section can either contact the front face of the elastomer body, or the press body can be arranged in between. The extension of the section "under an angle" to the center axis can for instance relate to an angle between 60° and 120°, preferably between 70° and 110°, further and particularly preferred between 80° and 100° or between 85° and 95° (the upper and the lower limits respectively belong to the respective angle region). A section extending perpendicularly (under an angle of 90°) to the center axis, including a certain variation as typical in applied technology, is particularly preferred.

In general, the section of the seal member, which extends under an angle to the center axis, and the section sealing against the line (axial section) are preferably offset in the axial direction (see above). Axially in between, a sleeve or funnel-like section can be provided. In a sense, the section provided for the mounting at the front face of the elastomer body can form a flange extending outwardly from the remaining seal member.

In a preferred embodiment, the seal member is made of a plurality of components, comprising a form part and a seal part softer than the form part. Preferably, the form part and the seal part are respectively made of a synthetic material, the form part being preferably made of a rigid plastic, for instance acryl butadiene styrene (ABS), and the seal part being preferably made of an elastomer, for instance a thermoplastic elastomer. Preferably, the form part and the seal part can be moulded against each other, forming a multicomponent moulding part, particularly preferred a multicomponent injection mounting part. For instance, the "softer material" of the seal member can have a Shore hardness being by at least 20%, 40% or 60% smaller than the Shore hardness of the form part material, wherein possible upper limits can for instance be not more than 95%, 90%, 85% or 80% (the lower and the upper limits shall also be disclosed independently of each other). For instance, the seal part can have a Shore hardness (A) of not more than 80 Shore, 75 Shore or 70 Shore and of for instance at least 20 Shore, 25 Shore, 30 Shore, 35 Shore or 40 Shore (the lower and the upper limits shall be also disclosed independently of each other). The form part can for instance have a Shore hardness (D) of at least 50 Shore, 60 Shore or 70 Shore, possible upper limits being for instance not more than 85 Shore or 80 Shore.

Alternatively to a two-component injection moulding part, the seal part and the form part can be multi-piece with respect to each other, namely be separate parts, the seal part being for instance a rubber part reversibly insertable into and removable from the through-hole in the form part (comparable to a "plug"). A plug being multi-piece to the form part can for instance be a blind closure which closes the through-hole initially. When the line is led through, for instance a membrane of the plug can be torn open; on the other hand, the blind closure plug can be re-placed by a plug having a through-hole for the line. For the sealing against the line, the plug with the through-hole can for instance comprise a sealing lip.

In general, the plug can for instance be held by a form-fit in the through-hole (in the form part), it can for instance comprise a circumferential groove on its outside in which the form part engages with a section defining the through-hole. For inserting, the plug can be compressed and pushed into the through-hole, widening then and being held by the form-fit. The form part being multi-piece to the plug (to the seal part) can be made of a synthetic material, in particular rigid plastic, but it can also be made of metal. In particular, the form part can also act as a press body, namely transmit the pressing force onto the elastomer body when it is tensioned (see below); the form part can for instance be a plate serving, on the one hand, as a press body and extending, on the other hand, further radially inwards covering the elastomer body through-opening, apart from the through-hole(s) for inserting the plug(s).

Unless otherwise specified, the embodiments described below are relevant for a form part and a seal part integral with each other (in particular a two-component injection moulding part) but also in case of a multi-piece design. Seen in die axial direction, the form part covers the elastomer body through-opening at least partly, wherein, in general, the form part can also be covered by the seal part, wherein a form part being uncovered at least partly is preferred. Therein, the form part defines a through-hole for the line, which can be closed by a blind closure in general (the latter can be made monolithically of the same material as the remaining form part). However, preferably, as far as only the form part is considered, a through-hole is provided therein in the initial state already. Independently thereof, the seal part is provided at this through-hole in such a way that it can be pressed against a line led through the through-hole.

Preferably, the seal part has an inner diameter decreasing in a direction away from the form part (funnel-shape), particularly preferred it automatically contacts the line when the latter is pushed through. At an end facing away from the form part, the seal part is preferably closed initially, wherein this end can be opened prior to leading through the line (for instance be pinched off) or is preferably torn open by the line itself when the latter is pushed through. Prior to leading through the line, the closed end acts as a blind closure. Such a seal part having a blind closure function is preferred in general, also independently of the inner diameter of the seal part decreasing in the direction away from the form part. Regarding the form part, an extension basically in the radial direction is preferred, the form part having a disk- or plate-like shape and being oriented to the center axis (of the elastomer body through-opening) such that the latter lies parallel to the thickness direction. In the thickness direction, the disk- or plate-like form part has its smallest extension, the area directions lying perpendicularly thereto.

Since the form part is made of a material harder in comparison, it can preferably transmit a pressing force onto the elastomer body when the tensioning bolt is tensioned. Preferably, no additional press body is provided at that front face of the elastomer body at which the form part is arranged; in other words, the tensioning of the tensioning bolt acts directly on the form part and the latter transmits the pressing force onto the elastomer body (distributed over a certain area). A nut arranged on the tensioning bolt and being rotated for the tensioning can for instance act directly onto the form part, possibly apart from a washer in between. In general, a plurality of through-holes can preferably be provided in the form part, namely at least two, further and particularly preferred at least three or four openings; upper limits (which shall also be disclosed independently of the lower limits) can for instance be not more than 20, 15 or 10 holes. At each of the holes, a seal part is provided, reference is made to the remarks above.

In general, namely also independently of the design with form part and seal part, the seal member can be adapted for leading through a plurality of lines (regarding numerical values for a "plurality" reference is made to the para above). For instance, the seal member can comprise a number of nozzles protruding axially, corresponding to the number of lines, wherein through each nozzle a line can be led through; on the outside of the nozzles, a respective tensioning member can be provided, see the disclosure above (tensioning strap or hose clamp and so on). With a section axially opposite to these nozzles, this seal member can be mounted at the elastomer body. However, on the other hand, a seal member adapted for leading through exactly one line can also be preferred.

Alternatively to the elastomer body and the seal member being separate parts, they can also be provided one-piece with each other, preferably monolithically. In general, in this disclosure, "one-piece" means not separable from each other without destroying a part. "Monolithically" means that there are no material boundaries inside, neither between different materials nor between materials having a different manufacturing history. Thus, in case of the monolithic design, there shall be no material boundary between the elastomer body and the seal member, they can for instance be manufactured in a moulding process, in the same step out of the same material, for instance as a one component injection moulding part. The one-piece/monolithic design can for instance be advantageous as the elastomer body and the seal member are sealed against each other initially then, independently of a mounting, which can prevent mistakes in mounting.

In general, also independently of being one-piece/monolithic with the seal member, the elastomer body is preferably monolithic as such. In general, it can for instance also be assembled from a plurality of separate elastomer body parts, however, an integral elastomer body manufactured in its shape as a whole is preferred. In general, it can be provided with a separating line, for instance with a detachable shell at its our circumferential surface, wherein the elastomer body can either be assembled from several parts or be provided monolithic (the shell and the remaining elastomer body can be connected monolithically by a material bridge, even though a separating line is provided). Preferably, the elastomer body extends continuously between its inner circumferential surface and its outer circumferential surface, namely without an interruption apart from a through-opening or through-openings for the tensioning bolts.

The invention also relates to a method of using the press seal system comprising the elastomer body and the seal member, wherein the elastomer body is tensioned first and pressed radially outwards, prior to sealing, namely prior to pressing the seal member against the line. When the seal member is sealed against the line, the elastomer body is tensioned already. In between, a time period of several minutes (for instance at least 1 minute, 5 minutes or 10 minutes), hours (for instance at least 2 hours, 4 hours or 6 hours), but also one or several days (at least 1 day, 2 days or 3 days) can lapse. Also, a time period of several weeks or months is possible, for instance when the electrical installation is made lately after a pre-installation of the press seal system which can for instance be mounted during the shell construction phase. A support tube provided preferably is placed already in the elastomer body through-opening when the elastomer body is tensioned, so that the inner circumferential of the latter is pressed radially inwards against the support tube.

In a preferred embodiment, the line is led through the elastomer body through-opening after the elastomer body has been tensioned. Reference is made to the time periods of the para above, which can lapse also in between tensioning the elastomer body and leading through the line.

In a preferred embodiment, the seal member is replaced by another seal member, preferably in case of the elastomer body being in the tensioned state; reference is made to the explanations above.

BRIEF DESCRIPTION OF THE DRAWINGS

Below, the invention is explained by exemplary embodiments, wherein the individual features can be relevant for the invention also in a different combination, and wherein the description relates to all claims categories.

In detail, it shows

DETAILED DESCRIPTION OF THE PREFERRED EMBODIMENT

Figure 1:
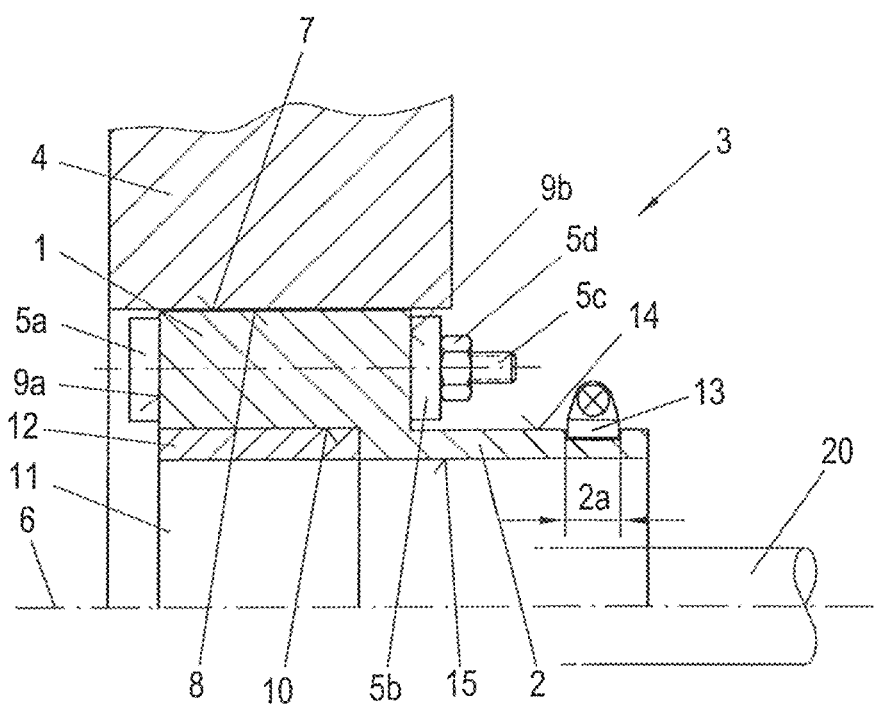
FIG. 1 a first press seal system according to the invention in a schematic section, having an elastomer body and a seal member.

FIG. 1 shows a first press seal system comprising an elastomer body 1 and a seal member 2 in a schematic section, the seal member being decoupled from the tensioning of the elastomer body 1, namely being sealable against a line 20 led through independently of the elastomer body. By means of the elastomer body 1, the press seal system is mounted in an opening 3 in the wall 4. For this purpose, the elastomer body 1 is compressed axially by a tensioning device 5, namely in direction of the center axis 6, and as a result contacts with its outer circumferential surface 7 a soffit 8 defining the opening 3, namely contacts it radially outwards sealingly.

As a part of the tensioning device 5, a respective press body 5a,b is arranged at both axial front faces 9a,b of the elastomer body 1. The press bodies 5a,b are connected with each other by a tensioning bolt 5c intersecting the elastomer body 1, such that by tensioning a nut 5d arranged on the tensioning bolt 5c (guided on an outer thread thereof) the press bodies can be moved towards each other axially. By rotating the nut 5d, the tensioning bolt 5c is tensioned such that the press bodies 5a,b are moved towards each other, the elastomer body 1 being compressed axially. For limiting therein an expansion of the inner circumferential surface 10 of the elastomer body 1 into the elastomer body through-opening 11, a support tube 12 is arranged in the latter. When being tensioned, the elastomer body 1 is pressed with its inner circumferential surface 10 against an outer wall area of the support tube 12.

In FIG. 1, the elastomer body 1 and the seal member 2 are monolithic with each other, namely injection moulded of a thermoplastic elastomer (TPE). The seal member 2 extends axially away from the elastomer body 1. An axial section 2a of the seal member provided for being pressed against the line is axially displaced to the elastomer body 1. In the axial section 2a, a tensioning member 13 is arranged on the outside for pressing the seal member against the line, namely a hose clamp. The latter rests on an outer wall area 14 of the seal member 2, so that by tensioning the hose clamp, the seal member 2 is pressed with its opposite inner wall area 15 against the line.

Below, further embodiments are described, wherein parts having the same reference numerals can have a comparable design or function, so that reference is also made to the description relating to the other figures. For the sake of clarity, the wall member and the line are not shown in case of the following embodiments, even though the elastomer body is mounted according to the description above.

Figure 2:
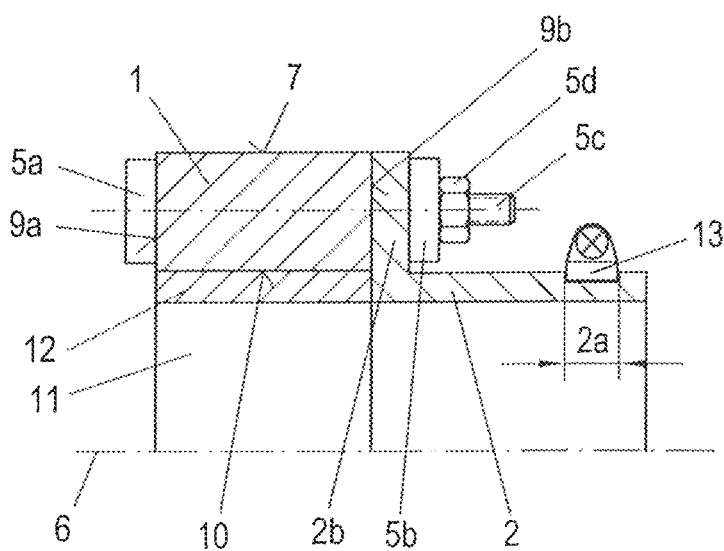
FIG. 2 a second press seal system according to the invention in a schematic section, having an elastomer body and a seal member.

In the embodiment of FIG. 2, the seal member 2 and the elastomer body 1 are multi-piece with respect to each other, namely are assembled as separate parts being manufactured individually before. In addition to the sleeve-like section with the axial section 2a, the seal member 2 comprises a section 2b extending radially away from the center axis 6, which serves for a mounting at the elastomer body 1. Namely, this mounting section 2b is clamped between a front face 9b of the elastomer body 1 and a press body 5b of the tensioning device 5, which is arranged at this front face 9b. Likewise, the seal member 2 is pressed against and mounted at the elastomer body 1 when the latter is tensioned.

Figure 3:
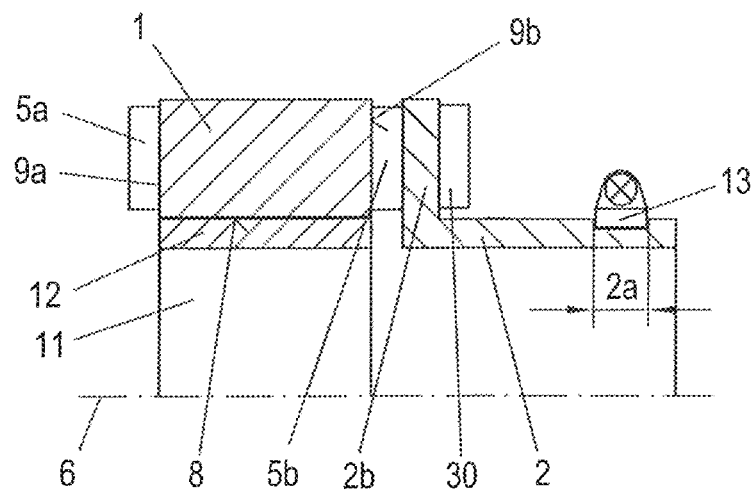
FIG. 3 a third press seal system according to the invention in a schematic section, having an elastomer body and a seal member.

In the embodiment of FIG. 3, the seal member 2 is designed as in case of FIG. 2, namely comprises in particular a mounting section 2b. However, the latter is not clamped between the front face 9b of the elastomer body 1 and the press body 5b, but between the latter and a mounting body 30. By a tensioning bolt (not shown), the press body 5b is tensioned with respect to the opposite press body 5a, wherein the tensioning bolt comprises a tensioning bolt head recessed in the press body 5b (looking on the press body 5b from the side, the tensioning bolt head is not visible thus).

After the tensioning of the elastomer body 1, the seal member 2 is placed at the press body 5b and clamped by the mounting body 30. The mounting body 30 is screwed with respect to the press body 5b, wherein the mounting section 2b of the seal member 2 is clamped in between. Advantageously, this embodiment can allow a replacement of the seal member 2 even when the elastomer body 1 is in the tensioned state.

Figure 4:
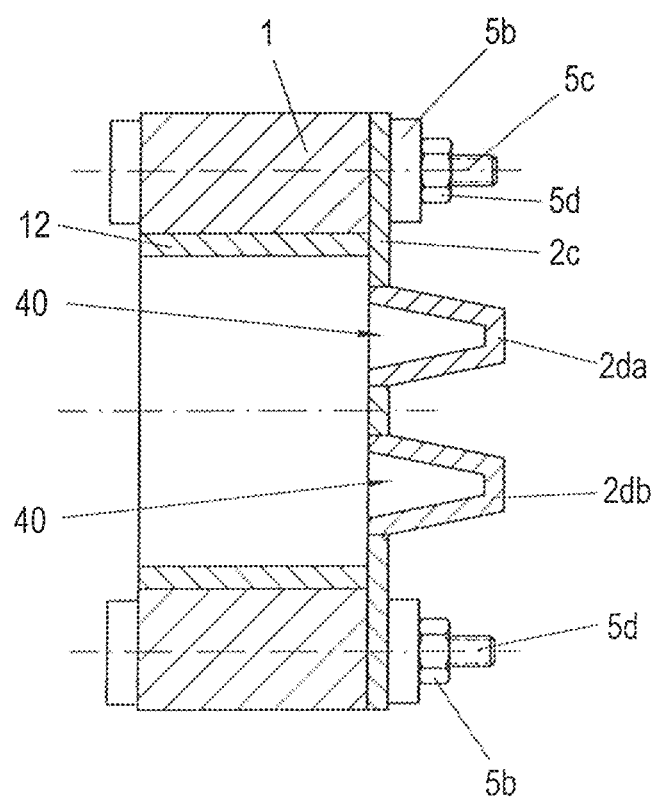
FIG. 4 a fourth press seal system according to the invention in a schematic section, having an elastomer body and a seal member.

In case of the embodiment of FIG. 4, the seal member 2 is a two-component injection moulding part. It comprises a form part 2c made of ABS, in which a plurality of through-holes 40 are provided. At each of the through-holes 40, a respective seal part 2d having a funnel-shape is moulded. The seal parts 2d are made of TPE and are injection moulded. At their respective end opposite to the form part 2c, the seal parts 2d are respectively closed, the seal parts 2d being open at these ends when a cable is pushed through (in the figure from the left), the respective seal part contacting the respective cable sealingly then. In case of the embodiment shown, the form part 2c is arranged axially between the press body 5b and the elastomer body 1; however, the form part 2c could be also pressed against the elastomer body by the nut 5d directly, so that the form part acts as a press body.

The invention claimed is:

1. A press seal system inserted into a_barrier opening and sealing said opening against a line, comprising:
    an elastomer body which defines a through-opening and
    a tensioning device for tensioning said elastomer body by compressing said elastomer body axially with respect to a center axis of said elastomer body through-opening and, consequently, pressing an outer circumferential surface of said elastomer body, with respect to said center axis, radially outwards for sealing, including a tensioning bolt intersecting said elastomer body axially wherein said elastomer body is compressible axially by tensioning said tensioning bolt; and
    a seal member adapted to seal against the line when it is led to or through said barrier opening,
    wherein said seal member
        is decoupled from the deformation of said elastomer body;
        is deformable radially more easily than said elastomer body, at least when said elastomer body is tensioned whereby said seal member has a first axial section adapted to be sealed against the line even when said elastomer body has already been tensioned;

has an outer wall surface which faces away from said center axis of said elastomer body through-opening;

is accessible even when said elastomer body is tensioned, and has a second axial section configured to have an inner diameter declining along an axial direction of said center axis of said elastomer body through-opening when sealed against the line, said first and second axial sections being different with said second axial section axially between said elastomer body and said first axial section;

wherein when configured to be compressed by said tensioning device, said elastomer body presses radially outward against said barrier opening.

2. The press seal system according to claim 1, wherein an inner wall surface of said seal member, which faces said center axis of said elastomer body through-opening, is, at least in an axial section provided for being pressed against the line, displaced radially inwards in comparison to an inner circumferential surface of said elastomer body, said inner circumferential surface lying radially opposite to said outer circumferential surface.

3. The press seal system according to claim 1, wherein at least an axial section of said seal member, which axial section is provided for being pressed against the line, is displaced axially with respect to said elastomer body.

4. The press seal system according to claim 1, wherein a support tube defines a through-opening for leading in or through the line and is placed in said elastomer body through-opening, wherein said elastomer body is, when being tensioned, pressed radially inwards against said support tube, said support tube defining a through-opening for leading in or through the line.

5. The press seal system according to claim 1, wherein a tensioning member is provided outside on said seal member in an axial section thereof, for pressing said seal member against the line.

6. The press seal system according to claim 1, wherein said elastomer body and said seal member are monolithic with each other.

7. A method of using the press seal system of claim 1, for inserting into an opening and sealing said opening against the line, comprising:

first tensioning said tensioning device to radially press said elastomer body against a barrier opening, wherein the outer wall surface of said seal member facing away from said center axis of said elastomer body through-opening is still accessible then, and thereafter, when said elastomer body is already tensioned, sealing said seal member against the line.

8. The method of using the press seal system according to claim 7, wherein said elastomer body is tensioned by said tensioning device first, and thereafter, when said elastomer body is already tensioned, the line is led through said elastomer body through-opening.

9. The press seal system according to claim 1, wherein the seal member inner diameter of the second axial member declines in the direction axially away from the elastomer body up to the first axial section adapted to be pressed against the line.

10. A press seal system inserted into a barrier opening and sealing said barrier opening against a line, comprising:

an elastomer body which defines an elastomer body through-opening, and a first tensioning device for tensioning said elastomer body by compressing said elastomer body axially with respect to a center axis of said elastomer body through-opening and, consequently, pressing an outer circumferential surface of said elastomer body, with respect to said center axis, radially outwards for sealing against the barrier opening, including a tensioning bolt intersecting said elastomer body axially wherein said elastomer body is compressible axially by tensioning said tensioning bolt, a seal member adapted to seal against the line when it is led to or through said barrier opening, wherein said seal member is decoupled from the deformation of said elastomer body, is deformable radially more easily than said elastomer body, at least when said elastomer body is tensioned, has a first axial section adapted to be sealed against the line even when said elastomer body has already been tensioned and a second axial section axially between said elastomer body and said first axial section, has an outer wall surface which faces away from said center axis of said elastomer body through-opening, and is accessible even when said elastomer body is tensioned; and a second tensioning device around the seal member outer wall surface and adapted to press the first axial section of the seal member against the line; and a support tube in said elastomer body through-opening defining a support tube through-opening for leading the line in or through the barrier opening, wherein said elastomer body when being tensioned presses radially inwards against said support tube.

11. The press seal system according to claim 10, wherein the second tensioning device is a hose clamp.

* * * * *